United States Patent [19]
Matsumoto et al.
[11] Patent Number: 4,777,104
[45] Date of Patent: Oct. 11, 1988

[54] ELECTROPHOTOGRAPHIC TONER MADE BY POLYMERIZING MONOMERS IN SOLUTION IN PRESENCE OF COLORANT

[75] Inventors: Tsunetaka Matsumoto; Masayoshi Okubo, both of Kobe; Toshiro Tokuno, Nishinomiya, all of Japan

[73] Assignee: Mita Industrial Co., Ltd., Osaka, Japan

[21] Appl. No.: 867,923

[22] Filed: May 29, 1986

[30] Foreign Application Priority Data

| | | | |
|---|---|---|---|
| May 30, 1985 | [JP] | Japan | 60-115373 |
| May 30, 1985 | [JP] | Japan | 60-115374 |
| Sep. 27, 1985 | [JP] | Japan | 60-212066 |
| Sep. 27, 1985 | [JP] | Japan | 60-212067 |

[51] Int. Cl.[4] .......... G03G 9/08; C08J 3/20
[52] U.S. Cl. .......... 430/109; 430/111; 430/137; 524/853; 524/901
[58] Field of Search .......... 430/137, 111, 109; 526/212; 524/901, 853

[56] References Cited

U.S. PATENT DOCUMENTS

| | | | |
|---|---|---|---|
| 3,391,082 | 7/1968 | Maclay | 430/137 X |
| 3,931,092 | 1/1976 | Ramlow et al. | 526/212 |
| 3,941,898 | 3/1976 | Sadamatsu | 430/121 |
| 4,016,099 | 4/1977 | Wellman | 430/137 |
| 4,077,804 | 3/1978 | Vanzo | 430/107 X |
| 4,232,111 | 11/1980 | Miyazako et al. | 430/434 X |
| 4,269,760 | 5/1981 | Wakimoto et al. | 424/853 |
| 4,559,303 | 12/1985 | Aotani et al. | 435/180 |

*Primary Examiner*—J. David Welsh
*Attorney, Agent, or Firm*—Sherman and Shalloway

[57] ABSTRACT

Disclosed is a process in which a spherical electrophotographic toner containing a colorant and having a particle size suitable for the electrophotography is directly formed in the polymerization process for formation of a binder resin. If a reaction medium capable of dissolving a monomer but incapable of dissolving a formed polymer is used and polymerization is carried out in the presence of a radical polymerization initiator in the state where the monomer, the colorant and other additives are dissolved or dispersed in the reaction medium, an electrophotographic toner having a desired particle size is obtained. According to this process, the particle size of the colored resin is stably controlled to 1 to 30 μm suitable for a toner in the polymerization process, and the particle size distribution is very sharp.

12 Claims, No Drawings

ELECTROPHOTOGRAPHIC TONER MADE BY POLYMERIZING MONOMERS IN SOLUTION IN PRESENCE OF COLORANT

BACKGROUND OF THE INVENTION (1) Field of the Invention

The present invention relates to a process in which a spherical electrophotographic toner containing a colorant and having a particle size in a range suitable for a toner is directly prepared in the polymerization process for formation of a binder resin.

Furthermore, the present invention relates to an electrophotographic toner which is excellent not only in the flowability but also in various photographic characteristics.

(2) Description of the Prior Art

In the electrophotographic process, a toner is used for visualizing an electrostatic image. Toner particles are composed of a composition comprising a binder resin and, incorporated therein, a colorant and other additives such as a charge controlling agent, and have a particle size adjusted to a certain level, for example, 1 to 30 μm. A resin having desirable electroscopic property and binding property, for example, a styrene resin, is used as the binder resin, and carbon black or other organic or inorganic coloring pigment is used as the colorant.

A most typical process for the production of an electrophotographic toner comprises melt-kneading a binder resin as described above with a colorant, cooling and pulverizing the molten composition and classifying the pulverized composition to recover a fraction having a certain particle size. The yield of the toner obtained through pulverization and classification is low and a large equipment is necessary for these operations. Accordingly, the manufacturing cost of the toner is very high. Moreover, the shape of the obtained particles is irregular and the flowability of the toner is generally low, and the toner is defective in that blocking is readily caused.

Various trials have been proposed to prepare toners directly in the polymerization process for formation of a binder resin. According to a typical instance, in a water-insoluble monomer is dissolved a polymerization initiator soluble in the monomer, additives such as a colorant are added to the solution, the resulting composition is suspended under high-speed shear stirring into an aqueous solution comprising an appropriate dispersant, for example, a water-soluble polymer, an inorganic powder and a surface active agent, and the suspension is subjected to polymerization to form colored polymer particles. According to this suspension polymerization process, however, the particle size of the final toner is determined by the state of suspension of the monomer composition in water, and the particle size distribution of the toner particles is very broad and readily influenced by the state of throwing of the monomer composition into water or by the stirring condition, and it is very difficult to obtain a toner uniform in the particle size. Furthermore, according to this suspension polymerization process, in general, only coarse particles having a size of scores of μm to several mm are formed, and particles having a size of 1 to 30 μm, suitable for a toner of a developer, can hardly be obtained. Of course, it is possible to reduce the particle size of the formed toner if the amount incorporated of the dispersant is increased. However, in this case, the dispersant is contained in the toner and the toner becomes sensitive to the moisture, and the electrophotographic characteristics are readily degraded. A particular post treatment is necessary to eliminate this disadvantage, and the step number is increased and the process cannot be practically worked.

A so-called emulsion polymerization is known as the process for preparing polymer. particles having a relatively uniform particle size. This emulsion polymerization process, however, is defective in that the obtained particles are too fine and have a particle size smaller than 1 μm and the step of removing the emulsifier after the polymerization is necessary. Therefore, according to this process, it is difficult to obtain a colored resin for a toner directly in the polymerization process.

Furthermore, there is known a process in which a styrene type or acrylic monomer having a polar group such as an amino group or a hydroxyl group and a colorant are subjected to suspension polymerization in the presence of an acid-soluble inorganic compound and the formed suspension is treated with an acid to obtain a toner composed of colored polymer fine particles (see Japanese Patent Publication No. 51-14895). This process, however, is defective in that a troublesome operation of dissolving and removing the inorganic compound becomes necessary and a part of the monomer is polymerized in the state dissolved in the aqueous phase at the dispersing and polymerizing steps to form as by-products fine polymer particles having a size smaller than 1 μm, as in the so-called emulsion polymerization.

SUMMARY OF THE INVENTION

It is a primary object of the present invention to provide a process for the preparation of an electrophotographic toner, in which a colored resin having a particulate structure suitable for use as the toner and being substantially free of a factor inhibiting electrophotographic characteristics of the toner can be directly prepared in the polymerization process for formation of the resin.

Another object of the present invention is to provide a process for the preparation of a toner, in which in the polymerization process for formation of a colored resin, the particle size of the colored resin is controlled to 1 to 30 μm, suitable for the toner, and uniform particle size distribution can be maintained.

Still another object of the present invention is to provide an electrophotographic toner to which a good chargeability is effectively given by using a small amount of a charge-controlling agent, and a process for the preparation of this toner.

The process for the preparing of an electrophotographic toner according to the present invention includes two fundamental embodiments (i) and (ii).

In accordance with the first embodiment (i) of the present invention, there is provided a process for the preparation of an electrophotographic toner comprising a binder resin and a colorant dispersed in the binder resin, which comprises dissolving or dispersing a radical-polymerizable monomer (A) and a colorant in a reaction medium and polymerizing the solution or dispersion in the presence of a radical polymerization initiator to obtain substantially spherical particles being composed of the formed resin and the colorant and having an average particle size of 1 to 30 μm, wherein the monomer (A) and the reaction medium are selected so that the monomer (A) is soluble in the reaction medium but the formed polymer is insoluble in the reaction medium.

In the process of the embodiment (i), the polymerization is carried out so that 30 to 99 mole% of the radical-polymerizable monomer (A) is converted to a polymer, and a radical-polymerizable monomer (B) having a charge-controlling group is added in an amount of 0.1 to 10 mole% based on the monomer (A) continuously or in one stage or a plurality of stages during the polymerization. According to this polymerization process, there is obtained an electrophotographic toner comprising a binder resin and a colorant dispersed in the binder resin, wherein the binder resin is composed of a mixture comprising a resin component I formed of a radical-polymerizable monomer (A) convertible to a fixing thermoplastic resin and a copolymer resin component II of said monomer (A) and a radical-polymerizable monomer (B) having a charge-controlling functional group, the monomer (B) is present in an amount of 0.1 to 10 mole% based on the monomer (A), 30 to 99 mole% of the monomer (A) is present in the resin component I and 1 to 70 mole% of the monomer (A) is present in the resin component II, and the toner consists of spherical particles having a uniform particle size.

In accordance with the second embodiment (ii) of the present invention, there is provided a process for the preparation of an electrophotographic toner, which comprises dissolving or dispersing particles comprising a binder resin and a colorant dispersed therein and a radical-polymerizable monomer (B) having a charge-controlling functional group or its mixture with a monomer constituting the binder resin or a monomer (C) capable of being swollen with the binder resin in a reaction medium capable of dissolving said monomer but incapable of dissolving the formed polymer and polymerizing the solution or dispersion in the presence of a radical polymerizable initiator to form a layer of a polymer or copolymer of the monomer having a charge-controlling functional group on the surfaces of the colored resin particles. According to the process of the second embodiment (ii), there is obtained an electrophotographic toner comprising a core comprising a binder resin and a colorant dispersed therein, and a layer composed of a polymer of a monomer (B) having a charged-controlling functional group or a copolymer of said monomer (B) with a monomer constituting said binder resin or a monomer (C) capable of being swollen with the binder resin, said layer being chemically or physically bonded to the surface of the core.

DETAILED DESCRIPTION OF THE PREFERRED EMBODIMENTS

Process of Embodiment (i)

In the process of the embodiment (i), a radical-polymerizable monomer (A) and a colorant are dissolved or dispersed in a reaction medium (solvent) and polymerization is carried out in the presence of a radical polymerization initiator. It is important that the radical-polymerizable monomer (A) and the reaction medium should be selected so that the monomer (A) is soluble in the reaction medium but the formed polymer is insoluble in the reaction medium. The embodiment (i) of the present invention is based on the finding that if the so-selected monomer and reaction medium are used, a colored resin having a particle size larger than the particle size of resin particles obtained by customary emulsion polymerization and smaller than the particle size of resin particles obtained by customary suspension polymerization, which is in a range suitable for toner particles can be obtained.

Polymerization which is advanced in a solution is generally called solution polymerization. In this solution polymerization, the formed polymer is dissolved in the solvent. In the process of the present invention, the formed polymer is not dissolved in the solvent, that is, the reaction medium. In this point, the polymerization of the present invention is distinguished from the solution polymerization.

The reasons why colored particles having a particle size within the above-mentioned specific range and a relatively sharp particles size distribution can be obtained according to the present invention are believed to be as follows, though the reasons are not limited to those described below.

In the polymerization system of the present invention, at the initial stage, the polymerization is initiated and advanced in the reaction medium, and the formed polymer chain is dispersed in the polymerization mixture and is combined with dispersed particles of the colorant having a large specific surface area. It is believed that at the middle stage of the polymerization, the polymerization is advanced according to both the emulsion polymerization and the suspension polymerization. Namely, at the middle stage of the polymerization, that is, after formation of the polymer particles, the polymerization is initiated and the chain growth is effected on the interfaces of the polymer particles and in the interiors of the polymer particles under conditions where the monomer is easily included into the interiors of the polymer particles. Accordingly, it is believed that the formed colored polymer particles come to have a particle size intermediate between the particle size of resin particles obtained by emulsion polymerization and the particle size of resin particles obtained by suspension polymerization, which is in a range suitable for a toner. It is considered that supposing that the radius of polymer particles in the polymerization mixture is r, the speed of growth of the polymer particles is in inverse proportion to the surface area $4\pi r^2$ thereof, while the volume $(4/3)\pi r^3$ of the polymer particles is increased in proportion to the polymerization time. Accordingly, in case of fine polymer particles, the speed of increase of the particle size is large, and in case of coarse polymer particles, this speed is small, and as the result, polymer particles having a relatively sharp particle size distribution can be obtained. Furthermore, in the colored polymer particles growing with advance of the polymerization, a substantially spherical shape is maintained by the interfacial tension between the polymer particles and the reaction medium. This is another advantage.

Accordingly, in the colored particles obtained according to the present invention, the loss of the starting materials can be reduced because the classifying operation is not necessary, and the productivity is therefore improved, Moreover, the colored particles are excellent in the flowability and anti-blocking property as the powder, and if the amount used of the dispersant or activating agent is controlled, factors inhibiting the electrophotographic characteristics of the toner can be substantially eliminated. This is another prominent advantage.

Radical-Polymerizable Monomer (A)

The monomer (A) used in the embodiment (i) is radical-polymerizable and a polymer formed from this monomer has fixing and electroscopic properties required for a toner. At least one monomer having an ethylenic unsaturation is used so that the above-mentioned conditions are satisfied. For example, monovinyl aromatic monomers, acrylic monomers, vinyl ester type monomers, vinyl ether type monomers, diolefin type monomers and mono-olefin type monomers are preferably used.

As the monovinyl aromatic monomer, there can be mentioned monovinyl aromatic hydrocarbons represented by the following formula:

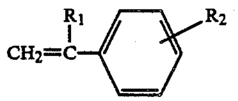

(1)

wherein $R_1$ stands for a hydrogen atom, a lower alkyl group or a halogen atom, and $R_2$ stands for a hydrogen atom, a lower alkyl group, a halogen atom, an alkoxy group, an amino group, a nitro group, a vinyl group or a carboxyl group, such as styrene, α-methylstyrene, vinyltoluene, α-chlorostyrene, o-, m- and p-chlorostyrenes, p-ethylstyrene, sodium styrene-sulfonate and divinylbenzene. These monomers may be used singly or in the form of mixtures of two or more of them. Furthermore, there can be mentioned acrylic monomers represented by the following formula:

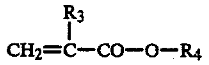

(2)

wherein $R_3$ stands for a hydrogen atom or a lower alkyl group, and $R_4$ stands for a hydrogen atom, a hydrocarbon group having up to 12 carbon atoms, a hydroxyalkyl group, a vinyl ester group or an aminoalkyl group, such as acrylic acid, methacrylic acid, methyl acrylate, ethyl acrylate, butyl acrylate, 2-ethylhexyl acrylate, cyclohexyl acrylate, phenyl acrylate, methyl methacrylate, hexyl methacrylate, 2-ethylhexyl methacrylate, ethyl β-hydroxyacrylate, propyl γ-hydroxyacrylate, butyl δ-hydroxyacrylate, ethyl β-hydroxymethacrylate, propyl γ-aminoacrylate, propyl γ-N,N-diethylaminoacrylate, ethylene glycol dimethacrylate and tetraethylene glycol dimethacrylate, vinyl esters represented by the following formula:

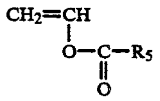

(3)

wherein $R_5$ stands for a hydrogen atom or a lower alkyl group, such as vinyl formate, vinyl acetate and vinyl propionate, vinyl ethers represented by the following formula:

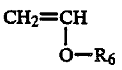

(4)

wherein $R_6$ stands for monovalent hydrocarbon group having up to 12 carbon atoms, such as vinylmethyl ether, vinylethyl ether, vinyl-n-butyl ether, vinylphenyl ether and vinylcyclohexyl ether, diolefins represented by the following formula:

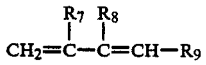

(5)

wherein $R_7$, $R_8$ and $R_9$ each stand for a hydrogen atom, a lower alkyl group or a halogen atom, such as butadiene, isoprene and chlororprene, and monoolefins represented by the following formula:

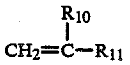

(6)

wherein $R_{10}$ and $R_{11}$ each stand for a hydrogen atom or a lower alkyl group, such as ethylene, propylene, isobutylene, butene-1, pentene-1 and 4-methylpentene-1.

In order to uniformalize the particle size in the colored resin particles, it is preferred that the radical-polymerizable monomer be capable of dissolving the formed polymer therein. For this purpose, a monovinyl aromatic monomer, especially styrene, an acrylic monomer or a mixture thereof is preferably used.

Colorant

A pigment or dye (hereinafter referred to as "coloring pigment") is used as the colorant for coloring the toner.

As preferred examples of the coloring pigment, there can be mentioned black pigments such as carbon black, acetylene black, lamp black and aniline black, yellow pigments such as chrome yellow, zinc yellow, cadmium yellow, yellow iron oxide, Mineral Fast Yellow, nickel titanium yellow, naples yellow, Naphthol Yellow S, Hansa Yellow G, Hansa Yellow 10G, Benzidine Yellow G, benzidine Yellow GR, Quinoline Yellow Lake, Permanent Yellow NCG and Tartrazine Yellow Lake, orange pigments such as chrome orange, molybdenum orange, Permanent Orange GTR, Pyrazolone Orange, Vulcan Orange, Indanthrene Brilliant Orange RK, Benzidine Orange G and Indanthrene Brilliant Orange GK, red pigments such as red iron oxide, cadmium red, red lead, mercury cadmium sulfide, Permanent Red 4R, Lithol Red, Pyrazolone Red, Watchung Red calcium salt, Lake Red D, Brilliant Carmine 6B, eosine lake, Rhodamine Lake B, alizarin lake and Brilliant Carmine 3B, violet pigments such as manganese violet, Fast Violet B and Methyl Violet Lake, blue pigments such as prussian blue, cobalt blue, Alkali Blue Lake, Victoria Blue Lake, Phthalocyanine Blue, metal-free Phthalocyanine Blue, partially chlorinated Phthalocyanine Blue, Fast Sky Blue and Indanthrene Blue BC, green pigments such as chrome green, chromium oxide, Pigment Green B, Malachite Green Lake and Fanal Yellow Green G, white pigments such as zinc flower, titanium oxide, antimony white and zinc sulfide, and extender pigments such as baryte powder, barium carbonate, clay, silica, white carbon, talc and alumina white.

As the magnetic pigment, there are known tri-iron tetraoxide ($Fe_3O_4$), di-iron trioxide (γ-$Fe_2O_3$), zinc iron oxide ($ZnFe_2O_4$), yttrium iron oxide ($Y_2Fe_5O_{12}$), cadmium iron oxide ($CdFe_2O_4$), gadolinium iron oxide ($Gd_3Fe_5O_{12}$), copper iron oxide ($CuFe_2O_4$), lead iron oxide ($PbFe_{12}O_{19}$), neodium iron oxide ($NdFeO_3$), barium iron oxide ($BaFe_{12}O_{19}$), magnesium iron oxide ($MgFe_2O_4$), manganese iron oxides ($MnFe_2O_4$), lanthanum iron oxide ($LaFeO_3$), iron powder (Fe), cobalt powder (Co) and nickel powder (Ni). In the present invention, fine powders of these known magnetic pigments may be used.

Reaction Medium

According to the present invention, an organic solvent capable of dissolving the monomer (A) but incapable of dissolving the formed polymer thereof is used as the reaction medium. In order to avoid bad influences of the solvent left in the toner, it is preferred that the organic solvent be easily volatile. The solvent actually used should be determined according to the kinds of the monomer and the polymer thereof. Alcohols, cellosolves, ketones and hydrocarbons are generally preferred. Mixtures of two or more of these solvents, or mixtures of these solvents with other compatible organic solvents or water may be used. As the alcohol, there can be mentioned lower alcohols such as methanol, ethanol and propanol. As the cellosolve, there can mentioned methylcellosolve and ethylcellosolve. As the ketone, there can be used acetone, methylethyl ketone and methylbutyl ketone. As the hydrocarbon, there can be used n-hexane, n-heptane and cyclohexane.

Polymerization Initiator

A polymerization initiator soluble in a liquid mixture of the monomer and reaction medium is used. For example, there can be mentioned azo compounds such as azobisisobutyronitrile and peroxides such as cumene hydroperoxide, t-butyl hydroperoxide, dicumyl peroxide, di-t-butyl peroxide, benzoyl peroxide and lauroyl peroxide. Moreover, combinations of ionizing rays such as γ-rays and accelerated electron beams or violet rays with photosensitizers may be used.

Additives

Additives desired to be incorporated into the toner besides the above-mentioned colorant may be added to the starting composition prior to the polymerization.

For example, a charge-controlling agent known to be valuable as a component of a two-component type pigment may be incorporated. For instance, there can be mentioned oil-soluble dyes such as Nigrosine Base (CI 5045), Oil Black (CI 26150) and Spilon Black, and metal salts of naphthenic acid, metal soaps of fatty acids and soaps of resin acids. Moreover, in order to impart an offset-preventing effect to the toner, there may be incorporated parting agents such as low-molecular-weight polyethylene, low-molecular-weight polypropylene, waxes and silicone oils.

Polymerization

According to the present invention, the above-mentioned components are dissolved or dispersed in the reaction medium and polymerization is carried out.

It is preferred that the amount charged of the monomer (A) be 1 to 50% by weight, especially 5 to 30% by weight, based on the reaction medium. The colorant may be incorporated in an amount to be included in the toner resin, and it is preferred that the amount of the colorant be 1 to 30% by weight, especially 3 to 20% by weight, based on the charged monomer. When the magnetic pigment is used, it is preferred that the magnetic pigment be incorporated in an amount of 5 to 300% by weight, especially 10 to 25% by weight, based on the charged monomer.

The amount of the initiator such as an azo compound or a peroxide may be a so-called catalytic amount, and generally, the amount is 0.1 to 10% by weight based on the charged monomer. Known polymerization temperature and time may be adopted, and generally, the polymerization is carried out at a temperature of 40° to 100° C. for 1 to 50 hours. Stirring of the polymerization mixture may be such gentle stirring that homogeneous reaction is caused as a whole. In order to prevent inhibition of the polymerization by oxygen, the atmosphere of the reaction system may be replaced by an inert gas such as nitrogen.

In the first embodiment (i) of the present invention, there may be adopted a method in which only a part of the monomer (A) is dissolved or dispersed in the reaction medium, polymerization is initiated in this state, and the remainder of the monomer (A) is added in a plurality of stages or continuously during the polymerization. It is considered that while the polymerization is in the stationary state, the concentration growing polymer radicals is constant. If the additional amount of the monomer (A) is added stepwise or continuously when the concentration of the monomer (A) in the polymerization mixture is reduced, the above-mentioned stationary state can be maintained and the growth of colored polymer particles can be further promoted. Also in this preferred embodiment, by using the above-mentioned specific combination of the monomer (A) and reaction medium, the particle size distribution of the formed colored polymer particles is made sharper and the particle size is more uniformalized.

In this preferred embodiment, the monomer-containing composition is added to the reaction medium continuously or intermittently. In case of intermittent addition, it is preferred that the monomer (A) in an amount at least 0.5 time, especially at least 1 time, the amount of the monomer (A) initially charged be added in at least two stages. The monomer added afterward may be the same as or different from the monomer initially charged. It should be understood that formation of a block copolymer is possible. It is preferred that the average addition speed of the monomer added afterward be substantially the same as the speed of polymerization of the monomer.

In case of a certain colorant, for example, carbon black, growing polymer radicals are caught on the surfaces of particles of the colorant to stop the growth of the polymer chain, resulting in the defect of incorporation of very fine particles in the final product. This disadvantage can be eliminated if the radical polymerization initiator is added in a plurality of stages during the polymerization or is added continuously. In this case, polymerization is initiated again on the surfaces of the colorant particles where the growth of the polymer is stopped. According to this preferred embodiment, substantially all of the colorant can be combined and integrated with the formed polymer, and the process is advantageous in that screening or classification is not necessary at all.

In this preferred embodiment, the additional amount of the radical polymerization initiator is added to the additional amount of the monomer and the mixture is added stepwise or continuously.

It is preferred that the amount of the additional polymerization initiator be 0.1 to 10 times, especially 0.5 to 5 times, the amount of the initially added polymerization initiator based on the weight. Furthermore, the additional polymerization initiator may be dissolved in the additional monomer and the solution may be added to the polymerization mixture.

Since the polymerization product is obtained in the form of particles having a particle size within the above-mentioned range, the formed particles are filtered, washed with the above-mentioned solvent if necessary and dried to obtain colored particles for a toner.

If necessary, the colored particles for a toner are sprinkled with carbon black, hydrophobic silica or the like to obtain a final toner.

A dispersion stabilizer may be used for the preparation of the toner according to need. As the dispersion stabilizer, there are preferably used polymers soluble in the reaction medium, such as polyvinyl alcohol, methylcellulose, ethylcellulose, polyacrylic acid, polyacrylamide, polyethylene oxide and poly(hydroxystearic acid-g-methyl methacrylate-co-methacrylic acid) copolymer, and non-ionic and ionic surface active agents.

In the polymerization process according to the first embodiment (i) of the present invention, there may be preferably adapted a method in which the radical-polymerizable monomer (A) is polymerized to the midway, a radical-polymerizable monomer (B) having a charge-controlling functional group (hereinafter referred to as "polar group") is added to the reaction mixture, and the polymerization is conducted.

In the case where the monomer (B) having a charge-controlling functional group is made present from the start of the polymerization, fine polymer particles formed at the initial stage are stably dispersed in the polymerization mixture by the electrostatic repulsive force owing to the charge of the functional group, and appropriate aggregation or coalescence of fine particles is hardly caused and coalescence with the colorant is not caused even to the terminal stage of the polymerization, and fine particles of the polymer having a charge-controlling functional group are present in the state mixed in the toner polymer particles free of the functional group or containing the functional group at a very low concentration. When the product is used for a toner, such uncolored resin fine particles should be removed and the content of the polar group is very low as compared with the amount incorporated of the monomer (B), and it often happens that the intended chargeability-imparting effect cannot be obtained. Furthermore, in some cases, the chargeability-imparting effect differs among the particles. Moreover, since the monomer (B) having a polar group is relatively expensive, the process is economically disadvantageous.

In contrast, according to the preferred embodiment, the monomer (A) convertible to an insulating binder resin is first polymerized to form a colorant-containing copolymer particles and the monomer (B) having a polar group is added to continue the polymerization, whereby the monomer (B) having a polar group is efficiently included in the toner particles and in this state, the polymerization and formation of spherical particles are advanced. Accordingly, the residual amount of uncolored polymer fine particles can be controlled to a very low level, and the polar group-containing monomer can be made present efficiently at a uniform concentration in colored particles valuable as a toner. Furthermore, the step of separating and removing uncolored fine particles can be omitted and the amount of the expensive polar group-containing monomer can be reduced, and the process is economically advantageous.

Even the method in which a part of the polar group-containing monomer (B) is added at the initial stage of the polymerization is included in the scope of the present invention, so far as the above-mentioned polymerization state is maintained.

In the toner obtained according to this preferred embodiment, the binder resin is characterized in that the binder resin contains a resin component I composed of the monomer (A) convertible to an insulating binding resin and a copolymer resin component II composed of the monomer (A) and the monomer (B) having a charge-controlling functional group in the form of a mixture. Parts of the resin components I and II may be connected in the form of a block or graft copolymer. Namely, the resin component I consists of a polymer chain of the formula -A-A-A-A-A-A-A-A-A-, and the resin component II consists of a random copolymer chain of the formula -A-A-B-A-A-A-B-B-A-. A part of the resin component I and a part of the copolymer component II are present in the form of a block or graft copolymer.

Since the copolymer resin component II has the above-mentioned chain structure and is rich in the compatibility with the resin component I, the spherical toner particles obtained according to this preferred embodiment are characterized in that the resin composition is uniform among the respective particles. Furthermore, a sufficient charge-controlling effect can be attained with a relatively small amount of the monomer (B), and the fixing property is good, there is no moisture sensitivity, the particle size is uniform and the flowability is excellent.

If the monomer (B) having a charge-controlling functional group is used in such a small amount as 0.1 to 10 mole%, especially 0.5 to 5 mole%, based on the monomer (A), a satisfactory charge-controlling effect can be attained. If the amount of the monomer (B) is too small and is below the above-mentioned range, the charge-controlling effect is reduced, and if the amount of the monomer exceeds the above-mentioned range, the toner becomes moisture-sensitive and degradation of changing characteristics and flowability is readily caused under high humidity conditions. In the toner of this preferred embodiment, it is important that 30 to 99 mole%, especially 50 to 95 mole%, of the monomer (A) should be included in the resin component I while 1 to 70 mole%, especially 5 to 50 mole%, of the monomer (A) should be included in the copolymer resin component II. If this requirement is not satisfied, the efficiency of inclusion of the monomer (B) in the spherical particles is reduced.

The obtained colored particles need not be subjected to the classifying operation and the loss of the starting materials can be reduced, and the productivity is very high. The toner particles are excellent in the flowability and anti-blocking property as the powder and also excellent in the fixing property and charge-controlling effect. Furthermore, by controlling the amount used of the dispersant or activating agent, factors inhibiting the electrophotographic characteristics can be substantially eliminated.

As the charge-controlling functional group-containing monomer (B), there may be used radical-polymerizable monomers having an electrolyzable group, for example, a sulfonic acid, phosphoric acid or carboxylic acid type anionic type or a cationic group such as a primary, secondary or tertiary amino group or a quaternary ammonium group. As preferred examples, there can be mentioned styrene-sulfonic acid, sodium styrene-sulfonate, 2-acrylamido-2-methylpropane-sulfonic acid, 2-acid-phosphoxypropyl methacrylate, 2-acid-phosphoxyethyl methacrylate, 3-chloro-2-acid-phosphoxypropyl methacrylate, acrylic acid, methacrylic acid, fumaric acid, crotonic acid, tetrahydroterephthalic acid, itaconic acid, aminostyrene, aminoethyl methacrylate, aminopropyl acrylate, diethylaminopropyl acrylate, γ-N-(N',N'-diethylaminoethyl)aminopropyl methacrylate and trimethyl ammonium propyl methacrylate.

According to this preferred embodiment, the monomer (B) is added to the polymerization mixture in the midway of the polymerization, that is, when the polymerization ratio of the monomer (A) is 30 to 99%, especially 50 to 95%. The monomer (B) may be added in one stage or a plurality of stages, or continuously. The monomer (B) may be added singly or in the form of a mixture with the monomer (A).

When the monomer (B) is added in the midway of the polymerization of the monomer (B), the monomer (B) can be efficiently absorbed in growing polymer particles of the monomer (A).

Process of Embodiment (ii)

According to the process of the embodiment (ii) of the present invention, particles comprising a binder resin and a colorant dispersed in the binder resin (hereinafter referred to as "colored resin particles") and a monomer (B) having a charge-controlling group or a mixture of said monomer (B) with a monomer constituting the binder resin or a monomer (C) capable of being swollen with the binder resin are dispersed or dissolved in a reaction medium, the dispersion or solution is subjected to radical polymerization, and a solvent capable of dissolving the monomer and incapable of dissolving the formed polymer is used as the reaction medium.

Polymerization advanced in a solution is generally called solution polymerization, and in this solution polymerization, the formed polymer is dissolved in the solvent. On the other hand, in the process of the present invention, the formed polymer is not dissolved in the solvent, that is, the reaction medium. In this point, the polymerization of the present invention is distinguished from the solution polymerization.

In the polymerization process of the embodiment (ii), the polymerization of the monomer is initiated in the solution phase or in the surface layer of the dispersed colored resin particles, and the formed polymer or growing polymer chain is precipitated on the surfaces of the dispersed colored resin particles. Especially when the monomer (C) is co-present with the monomer (B), since the monomer (C) is readily absorbed in the dispersed colored resin particles, the polymerization is more smoothly and efficiently advanced on the surface layer of the colored resin particles. In this case, it sometimes happens that growth of the chain of the monomer (B) or the monomers (B) and (C) is caused by so-called graft polymerization. Thus, according to the embodiment (ii) of the present invention, a charge-controlling layer composed of the polymer of the monomer (B) or the monomers (B) and (C) can be formed effectively and tightly on the core of the colored resin. In fact, according to the process of the embodiment (ii), at least 50%, especially at least 80%, of the used monomer can be converted to a covering layer bonded to the surface of the core, and the amount of the polymer separated from the core radicals is very small.

The electrophotographic toner obtained according to the process of the embodiment (ii) is characterized in that a thin layer of a charge-controlling polymer composed of the monomer (B) or the monomers (B) and (C) is chemically or physically bonded to the surface of a core composed of colored resin particles.

In this toner, since the charge-controlling monomer (B) is selectively included in the surface portions of the toner particles, high charge-controlling and chargeability-imparting effects can be efficiently attained with a much smaller amount of the monomer (B) than in the conventional toners. In fact, if the monomer (B) is used in such a small amount as 0.01 to 10% by weight, especially 0.1 to 5% by weight, based on the colored resin, a satisfactory chargeability can be imparted, which will become apparent from the examples given hereinafter.

Furthermore, since the charge-controlling polymer is polymeric and is different from a low-molecular-weight compound such as a surface active agent or a dye, the layer of this polymer is tightly bonded to the colored resin core, and therefore, even if the toner is used for a long time, the charging characteristics are not sensitive to the moisture and stable electrophotographic characteristics can always be obtained.

In order to include the charge-controlling monomer in the toner according to the suspension polymerization, it is necessary that the charge-controlling monomer should be present in oil drops of the binder resin-constituting monomer, and hence, the kind of the monomer to be used is strictly limited. On the other hand, an optional charge-controlling monomer can be selectively included in the surfaces of the colored resin particles without such limitation. If certain colored resin particles are prepared and the kind of the monomer (B) to be precipitated on the surfaces of the colored resin particles is changed, toners having either negative or positive charging characteristics can be optionally obtained. This is another prominent advantage attained by the present invention.

Moreover, by making the expensive charge-controlling agent present locally on the surfaces of the toner particles and thus including the monomer into the polymer layer, the manufacturing cost of the toner can be greatly reduced.

The charge-controlling monomer (B) alone may be used for the polymerization or used in combination with other monomer for the polymerization. In the case where the charge-controlling monomer (B) has a good compatibility with the colored resin particles, the monomer (B) alone may be used, but in the case where the monomer (B) is poor in the compatibility with the binder resin, the monomer (B) is used in combination with the binder resin-constituting monomer or a monomer capable of being swollen with the binder resin, whereby a layer of a charge-controlling copolymer bonded tightly to the surface of the core can be formed.

Colored Resin Particles

The colored resin particles may be prepared according to an optional granulation method such as a kneading pulverization granulation method, a spray-drying granulation method or a suspension polymerization method.

Binder Resin

A thermoplastic resin having fixing and electroscopic properties can be used as the binder resin. For example, there are preferably used homopolymers and copolymers of vinyl aromatic monomers, acrylic monomers, vinyl ester type monomers, vinyl ether type monomers, diolefin type monomers and mono-olefin type monomers, though resins that can be used are not limited to these polymers. Monomers exemplified above as the radical-polymerizable monomer (A) with respect to the embodiment (i) are used. A styrene resin, an acrylic resin and a styrene-acrylic copolymer resin are preferred.

Colorant, Reaction Medium and Polymerization Initiator

These ingredients mentioned above with respect to the embodiment (i) are used.

The weight ratio of the colorant to the binder resin may be changed in a broad range, and it is generally preferred that this weight ratio be in the range of from 1/100 to 20/100, especially from 3/100 to 10/100.

It is preferred that the particle size of the colored resin particles be 3 to 30 μm, especially 5 to 20 μm. The shape of the particles is not particular critical, and spherical and irregular shapes may be adopted.

Monomer (B) Having Charge-Controlling Functional Groups

The same monomers as mentioned above with respect to the embodiment (i) are used as the monomer (B).

As the monomer (C) to be used in combination with the monomer (B), binder resin-constituting monomers as mentioned above are used, and moreover, monomers different from the binder resin-constituting monomer but capable of being swollen with the binder resin may be used. For example, a styrene type monomer has a swelling property with not only polystyrene but also an acrylic resin, and a copolymer comprising this monomer is especially suitable for attaining the objects of the present invention.

Additives

Also in the preparation process of the embodiment (ii), additives desirable to be contained in the toner may be incorporated into the starting composition prior to the polymerization.

For example, a parting agent such as low-molecular-weight polyethylene, low-molecular-weight polypropylene, a wax or a silicone oil may be added so as to impart an offset-preventing effect to the toner.

Polymerization

In the second embodiment (ii) of the present invention, the colored resin particles are dispersed in the reaction medium, and the charge-controlling monomer (B) or a mixture of the monomer (B) and comonomer (C) is dissolved in the reaction medium and the polymerization is initiated.

The amount charged of the colored resin particles is 0.1 to 100% by weight, especially 1 to 50% by weight, based on the reaction medium. The amount charged of the monomer (B) is 0.01 to 10% by weight, especially 0.1 to 5% by weight, based on the reaction medium. When the comonomer (C) is used in combination with the monomer (B), the amount of the comonomer (C) is less than 100 times the amount of the momomer (B).

The amount of the polymerization initiator such as an azo compound or a peroxide may be a catalytic amount, and it is generally preferred that the amount charged of the polymerization initiator be 0.1 to 10% by weight based on the charged monomer. Known polymerization temperature and time may be adopted, and it is generally preferred that the polymerization be carried out at a temperature of 40° to 100° C. for 1 to 50 hours. Stirring of the reaction mixture may be such gentle stirring that homogeous reaction is advanced as a whole. In order to prevent inhibition of the polymerization by oxygen, the reaction atmosphere may be replaced by an inert gas such as nitrogen.

All of the monomer and polymerization initiator may be charged at a time, or parts of them may be first added and the remainders may be charged afterward stepwise or continuously.

Since the reaction product is obtained in the form of particles having the above-mentioned particle size, the formed particles are filtered, washed with the above-mentioned solvent if necessary and dried to obtain colored particles for a toner.

According to need, the colored particles for a toner are sprinkled with carbon black, hydrophobic silica or the like to obtain a final toner.

In the preparation process of the embodiment (i), according to need, a dispersion stabilizer may be used as in the first embodiment (i).

The present invention will now be described in detail with reference to the following examples that by no means limit the scope of the invention. Incidentally, Examples 1 through 5 and Comparative Examples 1 through 5 illustrate effects of the preparation process of the embodiment (i) of the present invention, and Examples 6 through 9 and Comparative Examples 1 through 9 illustrate effects of the preparation process of the embodiment (ii) of the present invention.

EXAMPLE 1

In 80 ml of ethanol was dissolved 8 g of polyacrylic acid, and 80 g of styrene, 20 g of n-butyl methacrylate, 5 g of carbon black (Printex L supplied by Degussa) and 1 g of azobisisobutyronitrile were added to the solution and reaction was carried out with stirring at 150 rpm in a nitrogen current at 80° C. for 15 hours in a separable flask having a capacity of 1 l to complete polymerization. When the obtained polymer was observed by an optical microscope, it was found that the polymer was composed of spherical black particles having a particle size of about 10 μm. The polymer was separated by sedimentation, washed with ethanol 3 times and dried to obtain 95 g of a toner. At the separation by sedimentation, small quantities of polymer particles were still left in the supernatant. It is considered that since these polymer particles were removed at the washing step, the yield was somewhat reduced. The particle size distribution of the toner was determined by a coal tar counter. The obtained results are shown in Table 1. It was found that the particle size distribution was sharp and the average particle size was 10.4 μm. When the copying operation was carried out in a copying machine (Mita DC-211) charged with this toner, a clear image was obtained.

TABLE 1

| Particle Size | Example 1 | Commercial Product (for DC-211) |
|---|---|---|
| average particle size (μm) | 10.4 | 12.0 |
| smaller than 8.0 μm | 6% | 6% |
| 8.0 to 12.7 μm | 74% | 51% |
| large than 12.7 μm | 20% | 43% |

COMPARATIVE EXAMPLE 1

The procedures of Example 1 were repeated in the same manner except that 800 ml of distilled water was used instead of 800 ml of ethanol and the mixture was sufficiently dispersed by stirring at 3000 rpm for 5 minutes by using a homogenizing mixer (supplied by Tokushu Kika Kogyo) before the polymerization. The obtained polymer was slightly grayish. When the polymer was observed by an optical microscope, it was found that black indeterminate aggregates of carbon black and transparent polymer particles having a broad particle size distribution were present. Black particles that could be used as an electrophotographic toner were not obtained. The polymer was separated by sedimentation, washed with distilled water 3 times and dried to obtain 83 g of a comparative toner. The toner was only a mixture of polymer particles and carbon black. When the copying operation was carried out in a copying machine (Mita DC-211) charged with this toner, no clear image was obtained.

EXAMPLE 2

In 760 ml of methyl cellosolve and 40 ml of distilled water were dissolved 8 g of ethyl cellulose and 1 g of sodium dodecylbenzene-sulfonate, and 70 g of styrene, 29 g of 2-ethylhexyl methacrylate, 1 g of divinylbenzene, 5 g of cadmium red and 1 g of benzoyl peroxide were added to the solution. Reaction was carried out in a nitrogen current with stirring at 150 rpm at 80° C. for 8 hours in a separable flask having a capacity of 1 l to complete polymerization. When the obtained polymer was observed by an optical microscope, it was found that the polymer was composed of spherical red particles having a uniform particle size of about 10 μm. The polymer was separated by sedimentation, washed with methyl cellosolve 3 times and dried to obtain 98 g of a toner. When the copying operation was carried out in a copying machine (Mita DC-211) charged with this toner, a clear image was obtained.

COMPARATIVE EXAMPLE 2

The procedures of Example 2 were repeated in the same manner except that methyl cellosolve was not used but only 800 ml of distilled water was used as the medium, whereby polymerizable was completed. Incidentally, the mixture was sufficiently dispersed by stirring at 3000 rpm for 5 minutes by using a homogenizing mixer (supplied by Tokushu Kika Kogyo) before the polymerization. The obtained polymer was opaque and when the polymer was observed by an optical microscope, it was found that red indeterminate aggregates of cadmium red and very fine transparent polymer particles were present. The polymer was separated by sedimentation, washed with distilled water 3 times and dried to obtain 45 g of a comparative toner. The toner was only a mixture of polymer particles and cadmium red. When the copying operation was carried out in a copying machine (Mita DC-211) charged with this toner, no clear image was obtained.

EXAMPLE 3

In 800 ml of ethanol was dissolved 8 g of polyacrylic acid, and 20 g of styrene, 5 g of n-butyl methacrylate, 5 g of carbon black (Printex L supplied by Degussa) and 1 g of azobisisobutyronitrile were added to the solution. In a separable flask having a capacity of 1 l, the temperature was elevated to 80° C. in a nitrogen current with stirring at 150 rpm, and after passage of 2 hours, 4 hours and 6 hours, 20 g of styrene and 5 g of n-butyl methacrylate were additionally incorporated and reaction was conducted for 15 hours to complete polymerization. When the obtained polymer was observed by an optical microscope, it was found that the polymer was composed of spherical black particles having a particle size of about 10 μm. The polymer was separated by sedimentation, washed with ethanol 3 times and dried to obtain 105 g of a toner. The yield was 100%. The particle size distribution of the toner was measured by a coal tar counter. The obtained results are shown in Table 2. It was found that the particle size distribution was sharp. When the copying operation was carried out in a copying machine (Mita DC-211) charged with this toner, a clear image was obtained.

COMPARATIVE EXAMPLE 3

Polymerization was carried out in the same manner as described in Example 3 except that 80 g of styrene and 20 g of n-butyl methacrylate were first charged and the additional charging was not performed. When the obtained polymer was observed by an optical microscope, is was found that not only spherical particles having a particle size of about 10 μm but also small quantities of transparent particles composed solely of the polymer and having a particle size of about 2 μm were present. The polymer was separated by sedimentation, washed with ethanol 3 times to completely remove the particles composed solely of the polymer and dried to obtain 95 g of a toner. The yield was 90%. The particle size distribution of the obtained toner was measured by a coal tar counter. The obtained results are shown in Table 2. It was found that the particle size distribution was broader than that of the toner obtained in Example 3. When the copying operation was carried out in a copying machine (Mita DC-211) charged with the obtained toner, a clear image was obtained, but the resolving power was somewhat lower than in Example 3.

TABLE 2

| Particle Size | Example 3 | Comparative Example 3 |
|---|---|---|
| average particle size (μm) | 10.0 | 10.4 |
| smaller than 8.0 μm | 3% | 6% |
| 8.0 to 12.7 μm | 82% | 74% |
| larger than 12.7 μm | 15% | 20% |

EXAMPLE 4

In 800 ml of ethanol was dissolved 8 g of polyacrylic acid, and 80 g of styrene, 20 g of n-butyl methacrylate, 5 g of carbon black (Printex L supplied by Degussa) and 1 g of azobisisobutyronitrile were added to the solution. In a separable flask having a capacity of 1 l, reaction was carried out at 80° C. in a nitrogen current with stirring at 150 rpm, and when the polymerization ratio reached 80%, 1 g of 2-acid-phosphoxyethyl methacrylate was added and reaction was further conducted for 15 hours to complete polymerization. When the obtained polymer was observed by an optical microscope, it was found that the polymer was composed of spherical black particles having a particle size of about 10 μm. The polymer was separated by sedimentation, washed with ethanol 3 times and dried to obtain 96 g of a toner. Small amounts of polymer particles were left in the supernatant at the separation by sedimentation, and it is considered that the yield was reduced because these polymer particles were removed at the washing step. The particle size distribution of the toner was measured by a coal tar counter. The obtained results are shown in Table 3. It was found that the particle size distribution was sharp and the average particle size was 10.4 μm. The toner was mixed with an iron powder carrier (EFV 250/400 supplied by Nippon Teppun), and the charge quantity was measured by the blow-off method. The obtained results are shown in Table 4. When the copying operation was carried out in a copying machine (Mita DC-211) charged with this toner, a clear image was obtained without substantial scattering of the toner in the developing zone.

COMPARATIVE EXAMPLE 4

In 800 ml of ethanol was dissolved 8 g of polyacrylic acid, and 80 g of styrene, 20 g of n-butyl methacrylate, 1 g of 2-acid-phosphoxyethyl methacrylate, 5 g of carbon black (Printex L supplied by Degussa) and 1 g of azobisisobutyronitrile were added to the solution. In a separable flask having a capacity of 1 l, reaction was carried out in a nitrogen current at 80° C. with stirring at 150 rpm, and polymerization was completed over a period of 15 hours. When the obtained polymer was observed by an optical microscope, it was found that the polymer was composed of spherical black particles having a particle size of about 10 μm. The polymer was separated by sedimentation, washed with ethanol 3 times and dried to obtain 80 g of a toner. Small amounts of polymer particles were left in the supernatant at the separation by sedimentation. and it is considered that since these polymer particles were removed at the washing step, the yield was reduced. The particle size distribution was measured by a coal tar counter. The obtained results are shown in Table 3. It was found that the particle size distribution was sharp and the average particle size was 9.5 μm. The charge quantity of the toner was smaller than that of the toner obtained in Example 4, as shown in Table 4. When the copying operation was carried out in a copying machine (Mita DC-211) charged with the obtained toner, a clear image was obtained, but the toner was somewhat scattered in the developing zone.

EXAMPLE 5

In 780 ml of methanol was dissolved 8 g of polyacrylic acid, and 20 g of styrene, 5 g of n-butyl methacrylate, 5 g of carbon black (Printex L supplied by Degussa) and 1 g of azobisisobutyronitrile were added to the solution. In a separable flask having a capacity of 1 l, the temperature was elevated to 65° C., 60 g of sytrene and 15 g of n-butyl methacrylate were added styrene and 15 g of n-butyl methacrylate were added dropwise over a period of 10 hours in a nitrogen current with stirring at 150 rpm. The polymerization ratio was about 70% at the time of completion of the dropwise addition. Then, 20 ml of a 5% aqueous solution of sodium styrene-sulfonate and 0.5 g of azobisisobutyronitrile were added to the reaction mixture, and reaction was further conducted for 10 hours to complete polymerization. When the formed polymer was observed by an optical mciroscope, it was found that the polymer was composed of spherical black particles having a particle size of about 10 μm. The polymer was separated by sedimentation, washed with methanol 3 times and dried to obtain 106 g of a toner. The yield was 100%. The particle size distribution of the toner was measured by a coal tar counter. The obtained results are shown in Table 3. It was found that the particle size distribution was sharp and the average particle size was 9.7 μm. The charge quantity of the toner was measured according to the blow-off method. The obtained results are shown in Table 4. When the copying operation was carried out in a copying machine (Mita DC-211) charged with this toner, a clear image was obtained without substantial scattering of the toner in the developing zone.

COMPARATIVE EXAMPLE 5

In 780 ml of methanol was dissolved 8 g of polyacrylic acid, and 80 g of styrene, 20 g of n-butyl methacrylate, 20 ml of a 5% aqueous solution of sodium styrene-sulfonate, 5 g of carbon black (Printex L supplied by Degussa) and 1.5 g of azobisisobutyronitrile were added. In a separable flask having a capacity of 1 l, the temperature was elevated to 65° C. and polymerization was carried out for 20 hours in a nitrogen current with stirring at 150 rpm. When the formed polymer was observed by an optical microscope, it was found that the polymer was composed of spherical black particles having a particle size of about 10 μm. The polymer was separated by sedimentation, washed with methanol 3 times and dried to obtain 90 g of a toner. Small quantities of polymer particles were left in the supernatant at the separation by sedimentation, and it is considered that since these particles were removed at the washing step, the yield was reduced. The particle size distribution of the toner was measured by a coal tar counter. The obtained results are shown in Table 3. It was found that the particle size distribution was sharp and the average particle size was 10.0 μm. The charge quantity of the toner was smaller than that of the toner obtained in Example 5, as shown in Table 4. When the copying operation was carried out in a copying machine (Mita DC-211) charged with this toner, a clear copy was obtained but the toner was scattered in the developing zone.

TABLE 3

| | Example 4 | Example 5 | Comparative Example 4 | Comparative Example 5 |
|---|---|---|---|---|
| average particle size (μm) | 10.4 | 9.7 | 9.5 | 10.0 |
| smaller than 8.0 μm | 8% | 10% | 15% | 18% |
| 8.0 to 12.7 μm | 68% | 71% | 70% | 65% |
| larger than 12.7 μm | 24% | 19% | 15% | 17% |

TABLE 4

| | Charge Quantity (μC/g) |
|---|---|
| Example 4 | −18 |
| Example 5 | −20 |
| Comparative Example 4 | −10 |
| Comparative Example 5 | −11 |

EXAMPLE 6

Colored resin particles (a) having an average particle size of 10 μm were obtained by melt-kneading, pulverizing and classifying 100 parts by weight of a styrene/n-butyl methacrylate copolymer, 7 parts by weight of carbon black and 1.5 parts by weight of a polyolefin wax. A composition shown in Table 5 (run No. 1, 2 or 3), which comprised the colored resin particles (a), was charged in a separable flask having a capacity of 1 l, and reaction was carried out at 65° C. in a nitrogen current with stirring at 150 rpm for 5 hours to complete polymerization. When the obtained polymer was observed by an optical microscope, it was found that the polymer was composed of black particles having a uniform particle size of about 10 μm and uncolored fine particles were not substantially present. The polymer was separated by filtration and dried under reduced pressure to obtain a toner. The polarity of each of the toners obtained in this example was negative, as shown in Table 9 illustrating the results of the measurement of the charge quantity according to the blow-off method. When the copying operation was carried out in a copying machine (Mita DC-211) by using these toners, a clear image having no fog was obtained in each case.

TABLE 5

| | Run No. 1 | Run No. 2 | Run No. 3 |
|---|---|---|---|
| colored resin particles (g) | 108.5 | 108.5 | 108.5 |
| methanol (ml) | 450 | 450 | 450 |
| distilled water (ml) | 50 | 50 | 50 |
| styrene (g) | 1 | 5 | 20 |
| sodium styrene-sulfonate (g) | 0.1 | 1 | 5 |
| benzoyl peroxide (g) | 0.01 | 0.06 | 0.25 |

EXAMPLE 7

A separable flask having a capacity of 1 l was charged with a composition shown in Table 6 (run No. 4, 5 or 6), which comprised the colored resin particles obtained in Example 6, and reaction was carried out at 65° C. in a nitrogen current with stirring at 150 rpm for 5 hours to complete polymerization. When the formed polymer was observed by an optical microscope, it was found that the polymer was composed of black particles having a uniform particle size of about 10 μm and uncolored fine particles were not substantially present. The polymer was separated by filtration and dried under reduced pressure to obtain a toner. The polarity of the toner was positive as shown in Table 9 illustrating the results of the measurement of the charge quantity according to the blow-off method. When the copying operation was carried out in a copying machine (Mita DC-15) charged with this toner, a clear image having no fog was obtained.

TABLE 6

| | Run No. 4 | Run No. 5 | Run No. 6 |
|---|---|---|---|
| colored resin particles (g) | 108.5 | 108.5 | 108.5 |
| methanol (ml) | 450 | 450 | 450 |
| styrene (g) | 1 | 5 | 20 |
| dimethylaminoethyl methacrylate quaterenary compound (g) | 0.1 | 1 | 5 |
| azobisisobutyronitrile (g) | 0.01 | 0.06 | 0.25 |

EXAMPLE 8

A sufficiently stirred mixture comprising 96 parts by weight of styrene, 4 parts by weight of divinylbenzene, 5 parts by weight of carbon black and 1 part by weight of azobisisobutyronitrile was added to 500 parts by volume of distilled water containing, dissolved therein, 20 parts by weight of partially saponified Poval (having a saponification degree of 88%) and 1 part by weight of sodium dodecylsulfate, and the mixture was stirred at 3000 rpm for 10 minutes by using a homogenizing mixer (supplied by Tokushu Kika Kogyo) and charged in a separable flask having a caapacity of 1 l. Reaction was carried out at 70° C. for 8 hours in a nitrogen current with stirring at 150 rpm to complete polymerization. The formed polymer was separated by sedimentation, washed sufficiently, dried under reduced pressure and classified to obtain colored resin particles (b) having an average particle size of 10 μm. Then, a separable flask having a capacity of 1 l was charged with 105 g of the colored resin particles (b), 450 ml of methanol, 50 ml of distilled water, 1 g of sodium styrene-sulfonate, 10 g of styrene and 0.1 g of azobisisobutyronitrile, and reaction was carried out at 65° C. for 5 hours in a nitrogen current with stirring at 150 rpm to complete polymerization. When the formed polymer was observed by an optical microscope, it was found that the polymer was composed of black particles having a uniform particle size of about 10 μm and uncolored fine particles were not substantially present. The polymer was separated by filtration and dried under reduced pressure to obtain a toner. The polarity of the toner was negative as shown in Table illustrating the results of the measurement of the charge quantity according to the blow-off method. When the copying operation was carried out in a copying machine (Mita DC-211) charged with this toner, a clear image having no fog was obtained.

EXAMPLE 9

A separable flask having a capacity of 1 l was charged with 105 g of the colored resin particles (b) obtained in Example 8, 450 ml of methanol, 50 ml of distilled water, 2 g of diethylaminoethyl methacrylate quaternary compound, 10 g of styrene and 0.1 g of azobisisobutyronitrile, and reaction was carried out at 65° C. for 5 hours in a nitrogen current with stirring at 150 rpm to complete polymerization. When the formed polymer was observed by an optical microscope, it was found that the polymer was composed of black particles having a uniform particle size of about 10 μm and uncolored fine particles were not substantially present. The polymer was separated by filtration and dried under reduced pressure. The polarity of the toner was positive as shown in Table 9 illustrating the results of the measurement of the charge quantity according to the blow-off method. When the copying operation was carried out in a copying machine (Mita DC-15) charged with the obtained toner, a clear image having no fog was obtained.

COMPARATIVE EXAMPLE 6

Three toners (runs Nos. 1 through 3) having an average particle size of 10 μm were prepared by melt-kneading, pulverizing and classifying compositions shown in Table 7. The polarity of each toner was negative as shown in Table 9 illustrating the results of the measurement of the charge quantity according to the blow-off method. When the copying operation was carried out in a copying machine (Mita DC-211) by using these toners, a clear image having no fog was obtained in case of the toner of run No. 9, but slight fogging was observed in images formed by using the toners of runs Nos. 7 and 8.

TABLE 7

| | Run No. 7 | Run No. 8 | Run No. 9 |
|---|---|---|---|
| styrene/n-butyl methacrylate copolymer resin (g) | 100 | 100 | 100 |
| carbon black (g) | 7 | 7 | 7 |
| polyolefin wax (g) | 0.1 | 0.1 | 0.1 |
| styrere/sodium styrene sulfonate copolymer (5/1) (g) | 0.6 | 6 | 30 |

COMPARATIVE EXAMPLE 7

Three toners (runs Nos. 10 through 12) having an average particle size of 10 μm were prepared by melt-kneading, pulverizing and classifying compositions shown in Table 8. The polarity of each toner was positive as shown in Table 9 illustrating the results of the measurement of the charge quantity according to the blow-off method. When the copying operation was carried out in a copying machine (Mita DC-15) by using these toners, a clear image having no fog was obtained in case of the toner of runs Nos. 10 and 11.

TABLE 8

| | Run No. 10 | Run No. 11 | Run No. 12 |
|---|---|---|---|
| styrene/n-butyl methacrylate copolymer resin (g) | 100 | 100 | 100 |
| carbon black (g) | 7 | 7 | 7 |
| polyolefin wax (g) | 0.1 | 0.1 | 0.1 |
| styrene/dimethylaminoethyl methacrylate quaternary compound copolymer resin (5/1) (g) | 0.6 | 6 | 30 |

COMPARATIVE EXAMPLE 8

A sufficiently stirred mixture comprising 96 parts by weight of styrene, 4 parts by weight of divinylbenzene, 1 part by weight of acid-phosphoxyethyl methacrylate, 5 parts by weight of carbon black and 1 part by weight of azobisisobutyronitrile was added to 500 parts by volume of distilled water containing, dissolved therein, 20 parts by weight of partially saponified Poval (having a saponification degree of 88%) and 1 part by weight of sodium dodecylsulfate, and the mixture was stirred at 3000 rpm for 10 minutes by using a homogenizing mixer (supplied by Tokushu Kika Kogyo) and charged in a separable flask. Reaction was carried out at 70° C. in a nitrogen current with stirring at 150 rpm for 8 hours to complete polymerization. The polymer was separated by filtration, sufficiently washed, dried under reduced pressure and classified to obtain a toner having an average particle size of 10 μm. The polarity of the toner was negative as shown in Table 9 illustrating the results of the measurement of the charge quantity according to the blow-off method. The charge quantity of this toner was smaller than that of the toner of Example 8. When the copying operation was carried out in a copying machine (Mita DC-211) charged with this toner, slight fogging was observed in the obtained image.

COMPARATIVE EXAMPLE 9

A sufficiently stirred mixture comprising 96 parts by weight of styrene, 4 parts by weight of divinylbenzene, 2 parts by weight of diethylaminoethyl methacrylate quaternary compound, 5 parts by weight of carbon black and 1 part by weight of azobisisobutyronitrile was added to 500 parts by volume of distilled water containing, dissolved therein, 20 parts by weight of partially saponified Poval (having a saponification degree of 88%) and 1 part by weight of sodium dodecylsulfate, and the mixture was stirred at 3000 rpm for 10 minutes by using a homogenizing mixer (supplied by Tokushu Kika Kogyo) and charged in a separable flask. Reaction was carried out at 70° C. in a nitrogen current with stirring at 150 rpm for 8 hours to complete polymerization. The polymer was separated by filtration, sufficiently washed, dried under reduced pressure and classified to obtain a toner having an average particle size of 10 μm. The polarity of the toner was positive as shown in Table 9 illustrating the results of the measurement of the charge quantity according to the blow-off method. When the copying operation was carried out in a copying machine (Mita DC-15) charged with the toner, slight fogging was observed in the obtained image.

TABLE 9

| | Charge Quantity (μC/g) |
|---|---|
| Example 6 | |
| Run No. 1 | −11 |
| Run No. 2 | −18 |
| Run No. 3 | −25 |
| Example 7 | |
| Run No. 4 | +10 |
| Run No. 5 | +13 |
| Run No. 6 | +17 |
| Example 8 | −15 |
| Example 9 | +10 |
| Comparative Example 6 | |
| Run No. 7 | −6 |
| Run No. 8 | −9 |
| Run No. 9 | −15 |
| Comparative Example 7 | |
| Run No. 10 | +1 |
| Run No. 11 | +5 |
| Run No. 12 | +10 |
| Comparative Example 8 | −9 |
| Comparative Example 9 | +6 |

We claim:

1. A process for the preparation of an electrophotographic toner comprising a binder resin and a colorant dispersed in the binder resin, which comprises dissolving at least one radical-polymerizable monomer (A) selected from the group consisting of an aromatic hydrocarbon represented by the following formula:

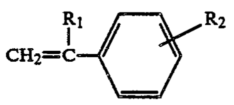 (1)

wherein $R_1$ stands for a hydrogen atom, a lower alkyl group or a halogen atom, and $R_2$ stands for a hydrogen atom, a lower alkyl group, a halogen atom, an alkoxy group, an amino group, a nitro group, a vinyl group or a carboxyl group, and an acrylic monomer represented by the formula:

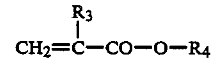 (2)

wherein $R_3$ stands for a hydrogen atom or a lower alkyl group, and $R_4$ stands for a hydrogen atom, a hydrocarbon group having up to 12 carbon atoms, a hydroxyalkyl group, a vinyl ester group or an aminoalkyl group, dispersing 1 to 30% by weight, based on the charged monomer, of a colorant in an organic solvent as the reaction medium selected from the group consisting of alcohols, cellosolves, ketones and hydrocarbons, the monomer (A) and the reaction medium being selected so that the monomer (A) is soluble in the reaction medium but the formed polymer is insoluble in the reaction medium, polymerizing said monomer (A) in the presence of a radical polymerization initiator, precipitating substantially spherical particles composed of the formed resin and the colorant and having an average particle size of 1 to 30 μm, and recovering said particles from the reaction medium.

2. A process according to claim 1, wherein a part of the monomer (A) is dissolved or dispersed in the reaction medium, polymerization is initiated, and the remainder of the monomer (A) is added in a plurality of stages or continuously during the polymerization.

3. A process according to claim 2, wherein the polymerization initiator is added in a plurality of stages or continuously during the polymerization.

4. A process according to claim 1 or 2, wherein the formed polymer of the radical-polymerizable monomer (A) is well soluble in the monomer (A) per se.

5. A process according to claim 1 or 2, wherein the radical-polymerizable monomer (A) is a stryene type monomer and the reaction medium is selected from the group consisting of an of alcohol, a cellosolve or a ketone.

6. A process according to claim 1 or 2, wherein the radical-polymerizable monomer (A) is a styrene type monomer and the reaction medium is a hydrocarbon.

7. The process of claim 1 wherein 0.1 to 10 mole % based on monomer (A) of a radical-polymerizable monomer (B) having a charge-controlling group is added when 30 to 99 mole % of the monomer (A) is converted to a polymer.

8. The process of claim 1 wherein the monomer (A) is charged in an amount of 1 to 50% by weight based on the reaction medium and a magnetic pigment in the form of a fine powder is incorporated in an amount of 5 to 300% by weight based on the charged monomer.

9. The process according to claim 1 wherein a part of the monomer (A) is charged in the reaction medium, polymerization is initiated and the remaining monomer (A) is added intermittently in an amount at least 0.5 times the amount initially charged and in at least two stages.

10. A process for the preparation of an electrophotographic toner comprising a binder resin and a colorant dispersed in the binder resin, which comprises (i) dissolving at least one radical-polymerizable monomer (A) selected from the group consisting of an aromatic hydrocarbon represented by the following formula:

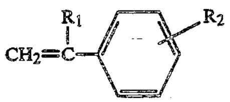
(1)

wherein $R_1$ stands for a hydrogen atom, a lower alkyl group or a haogen atom, and $R_2$ stands for a hydrogen atom, a lower alkyl group, a halogen atom, an alkoxy group, an amino group, a nitro group, a vinyl group or a carboxyl group, and an acrylic monomer represented by the following formula:

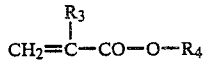
(2)

wherein $R_3$ stands for a hydrogen atom or a lower alkyl group, and $R_4$ stands for a hydrogen atom, a hydrocarbon group having up to 12 carbon atoms, a hydroxyalkyl group, a vinyl ester group or an aminoalkyl group, and dispersing 1 to 30% by weight, based on the charged monomer, of a colorant in an organic solvent as the reaction medium selected from the group consisting of alcohols, cellosolves, ketones, and hydrocarbons, the monomer (A) and the reaction medium being selected so that the monomer (A) is soluble in the reaction medium bu the formed polymer is insoluble in the reaction medium (ii) polymerizing said monomer (A) in the presence of a radical polymerization initiator, (iii) adding 0.1 to 10 mole % based on the monomer (A), of a radical-polymerizable monomer (B) having a charge-controlling functional group to the polymerization system when 30 to 99 mole % of the monomer (A) is coverted to a polymer, (iv) further continuing the polymerization, (v) precipitating substantially spherical particles composed of the formed resin and the colorant and having an average particle size of 1 to 30 μm, and (vi) recovering said particles from the reaction medium.

11. A process for the preparation of an electrophotographic toner comprising a binder resin and a colorant dispersed in the binder resin, which comprises (i) dispersing colored resin particles having a particle size of 3 to 30 μm, in which the weight ratio of the colorant to the binder is in the range of from 1/100 to 20/100, into an organic solvent as the reaction medium and dissolving 0.01 to 10% by weight, based on the colored resin, of a radical-polymerizable monomer (B) having a charge-controlling functional group and a comonomer (C) having a swelling property with said binder into the reaction medium, the amount of the comonomer (C) being less than 100 times the amount of the monomer (B), the combination of the monomers and the reaction medium being selected so that the monomers are soluble in the reaction medium but the formed polymer is insoluble in the reaction medium, (ii) polymerizing said monomers in the presence of a radical polymerization initiator to form a layer of a copolymer of the monomers (B) and (C) on the surfaces of the colored resin particles, and (iii) recovering said particles from the reaction medium.

12. An electrophotographic toner comprising a binder resin and a colorant dispersed in the binder resin and having a core-shell structure, wherein the core comprises (1) the binder resin composed of a monomer (A) selected from the group consisting of an aromatic hydrocarbon represented by the following formula:

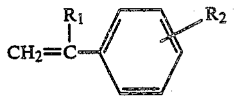
(1)

wherein $R_1$ stands for a hydrogen atom, a lower alkyl group or a halogen atom, and $R_2$ stands for a hydrogen atom, a lower alkyl group, a halogen atom, an alkoxy group, an amino group, a nitro group, a vinyl group or a carboxyl group, and an acrylic monomer represented by the following formula:

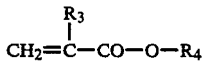

(2)

wherein $R_3$ stands for a hydrogen atom or a lower alkyl group, and $R_4$ stands for a hydrogen atom, ahydrocarbon group having up to 12 carbon atoms, a hydroxyalkyl group, a vinyl ester group or an aminoalkyl group, and (2) the colorant dispersed in the binder resin, the shell is chemically bonded to the core and comprises a copolymer of the monomer (A) and a monomer (B) having a charge-controlling functional group, and 30 to 99 mole % of the total monomer (A) is present in the core and 1 to 70 mole % of the total monomer (A) is present in the shell, the colorant being present in an amount of 1 to 30% by weight based on the monomer (A), the monomer (B) being present in an amount of 0.1 to 10 mole % based on the monomer (A), said toner consisting of spherical particles having a uniform particle size of 1 to 30 μm.

* * * * *

UNITED STATES PATENT AND TRADEMARK OFFICE

CERTIFICATE OF CORRECTION

PATENT NO. : 4,777,104

DATED : October 11, 1988

INVENTOR(S) : TSUNETAKA MATSUMOTO, ET AL.

It is certified that error appears in the above-identified patent and that said Letters Patent is hereby corrected as shown below:

IN THE CLAIMS

Column 23, claim 10, line 63, delete "haogen", insert --halogen--.

Column 24, claim 10, line 17, delete "bu", insert --but--;

Column 25, claim 12, line 11, delete "ahydrocarbon", insert --a hydrocarbon--.

Signed and Sealed this

Second Day of January, 1990

*Attest:*

JEFFREY M. SAMUELS

*Attesting Officer* *Acting Commissioner of Patents and Trademarks*